A. PRINZ.
POTATO SEPARATOR.
APPLICATION FILED JULY 24, 1913.
1,267,692.
Patented May 28, 1918.
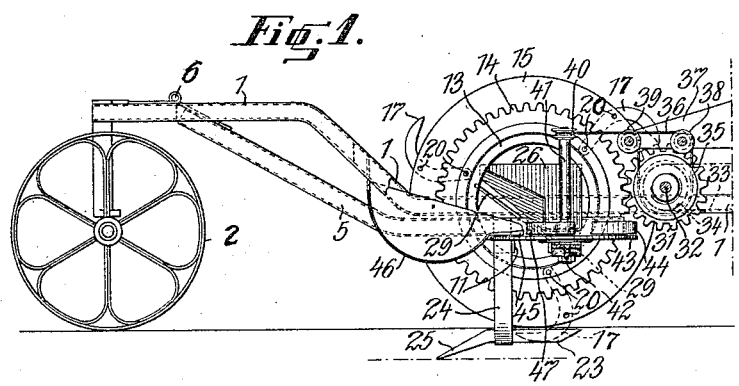

UNITED STATES PATENT OFFICE.

ALFRED PRINZ, OF SCHWIEBUS, GERMANY.

POTATO-SEPARATOR.

1,267,692.

Specification of Letters Patent.

Patented May 28, 1918.

Application filed July 24, 1913. Serial No. 780,956.

*To all whom it may concern:*

Be it known that I, ALFRED PRINZ, a citizen of the Empire of Germany, residing at Schwiebus, Germany, have invented certain new and useful Improvements in Potato-Separators, of which the following is a specification.

My invention relates to improvements in potato diggers, and more particularly in potato diggers in which the potatoes are dug from the soil by means of arms passing into the soil, and which are equipped with a rotary disk and a member for feeding the potatoes to another part of the digger. The object of the improvements is to provide a machine of this class in which the potatoes are separated from the stones which have been dug from the soil by the said arms. With this object in view my invention consists in providing a stationary member above the said disk and in the path of the potatoes fed thereto, which stationary member has such a height and shape that the potatoes are thrown over the same into a trough or the like while the heavier stones, which have a greater weight than the potatoes pass along the said stationary member and are thrown back on the soil.

In order that my invention be more clearly understood, an example embodying the same has been shown in the accompanying drawing, in which the same letters of reference have been used in all the views to indicate corresponding parts. In said drawing—

Figure 1, is a side view of the front part of the potato digger with some of the parts broken away, Fig. 2, is a plan view of the part of the machine shown in Fig. 1, and Fig. 3, is a vertical cross-section taken on the line A—B of Fig. 2.

In the example shown in the drawing the potato digger consists of a frame 1 which is mounted on front wheels 2 and rear wheels (not shown). Near the front end of the frame 1 a rocking frame is pivotally mounted on pivot bolts 6, which frame consists of rocking arms 4 and 5. The arm 4 carries a bearing 8 which provides a support for the pivot 9 of a rotary disk 10. To the arm 5 a ring 13 is secured by means of angle irons 11 and 12, and on the said ring an annular disk 15 formed with teeth 14 is mounted by means of an antifriction bearing provided by balls 16.

The disks 10 and 15 are rigidly connected with each other by transverse bars 20, and on the said bars gripping arms 17 are mounted which upon rotation of the disks 10 and 15 pass through the teeth of a rack 23 which is mounted on a bail 24 suspended from the arms 4 and 5 and provides a plow member passing with the forwardly directed front ends of the teeth through the soil.

Between the disks 10 and 15 a sieve 26 is supported by rods 27 and 28 which are attached to the ring 13. Below the sieve 26 a plate 29 is provided which is inclined downward and rearward and is secured with one end to the ring 13 and with the opposite end to rods 30 suspended from the sieve 26. The lower edge of the said plate is disposed substantially vertically above the rear edges of the teeth of the rack 23.

The teeth 14 are in mesh with the teeth of a pinion 31 keyed to a shaft 32 mounted on the frame 1. This shaft is adapted to be rotated from the rear axle by means of a chain 33 and a sprocket wheel 34, and it carries a grooved disk 35. In a bracket 42 secured to the frame 1 a vertical shaft 41 is mounted which carries a grooved disk 40 and a horizontal disk 43 located below the discharge end of the sieve 26. The grooved disks 35 and 40 are operatively connected by a rope or cord 36 which is trained on the said disks and on grooved guide rollers 38 and 39 mounted on a frame 37.

The disk 43 is formed about the larger part of its circumference with an upwardly directed flange 44. Above the disk a stop member in the form of a non-radial bar 45 is located which is connected with a trough 46. Between the said bar 45 and the discharge end of the sieve 26 a stripping member 47 is provided which is secured to the flange 44.

The operation of the digger is as follows: In order to throw the digger into operation the rocking frame 4, 5 and the parts mounted thereon are lowered, so that the ends 25 of the teeth of the rack 23 are forced into the soil when the digger is traveling over the same, whereby the potatoes are dug from the soil. The arms 17 are rotated from the rear axle through the chain and sprocket gearing 33, 34 and the gear wheels 31 and 14, and they pass between the teeth of the rack 23, raise the potatoes from the soil and drop the same on the sieve 26. While the potatoes slide downward on the inclined sieve, the soil which has been carried along by the teeth of the rack 23 drops on the inclined plate 29 from which it slides rearward.

From the sieve 26 the potatoes are delivered to the disk 43 which is being rotated from the shaft 32 through the rope gearing 35, 36, 38, 39, 40, and they are carried along by the said disk in the direction of the arrow shown in Fig. 2, until they strike against the member 45. The potatoes will now be thrown over the said member and they fall into the trough 46, while the stones which have been carried along and are still mixed with the potatoes slide along the member 45 by reason of their weight and are engaged by the stripping member 47 which throws them on the ground.

From the trough 46 the potatoes may be fed in any suitable way, for example by means of buckets which raise the potatoes and feed the same to an assorting device provided on the rear part of the machine which has not been illustrated.

In this way the potatoes are automatically separated from the stones which have been carried along by the arms 17, so that potatoes exclusively are taken from the trough and fed to the assorting mechanism.

I claim herein as my invention:

1. In a potato separator, the combination, of a rotary disk adapted to receive the potatoes dug from the soil, a stationary member provided above the said disk and adapted to permit the potatoes revolving with said disk to be thrown over the said member but to arrest heavy objects, the edge of the disk being free or exposed at a point out of registry with said stationary member, to allow the heavy objects to be thrown off at such point.

2. In a potato separator, the combination, of a rotary disk adapted to receive the potatoes dug from the soil, a stationary member provided above the said disk and adapted to permit the potatoes revolving with said disk to be thrown over the same but to arrest heavy objects, and a stripping member arranged above said disk behind the stationary member and adapted to strip from said disk the objects arrested by said member.

3. In a potato separator, the combination, of a rotary disk adapted to receive the potatoes and stones dug from the soil, and a stationary non-radial member arranged above said disk and adapted to arrest and deflect stones while allowing potatoes to be thrown over said member.

4. In a device of the class described, the combination, with a rotary disk adapted to receive the articles to be separated, of a stationary non-radial member arranged above said disk and adapted to arrest and deflect relatively heavy articles while allowing relatively light articles to be thrown over said stationary member.

5. In a device of the class described, the combination, with a rotary disk adapted to receive the articles to be separated, of a stationary non-radial member arranged above said disk and adapted to arrest and deflect relatively heavy articles while allowing relatively light articles to be thrown over said member, and a stripping member located above said disk and arranged to remove therefrom the articles arrested and deflected by said first-named member.

6. In a device of the class described, the combination, with a rotary disk adapted to receive the articles to be separated, of a stationary stop member arranged above said disk and adapted to arrest and deflect relatively heavy articles while allowing relatively light articles to be thrown over said member, and a stripping member also located above said disk and arranged to remove therefrom the articles arrested and deflected by said stop member.

In testimony whereof, I have signed this specification in the presence of two subscribing witnesses.

ALFRED PRINZ.

Witnesses:
 WOLDEMAR HAUPT,
 HENRY HASPER.